(12) United States Patent
Amiri et al.

(10) Patent No.: US 11,366,646 B2
(45) Date of Patent: Jun. 21, 2022

(54) METHOD AND APPARATUS FOR PREDICTING AND SCHEDULING COPY INSTRUCTION FOR SOFTWARE PIPELINED LOOPS

(71) Applicants: Ehsan Amiri, Thornhill (CA); Ning Xie, Newmarket (CA)

(72) Inventors: Ehsan Amiri, Thornhill (CA); Ning Xie, Newmarket (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 16/750,734

(22) Filed: Jan. 23, 2020

(65) Prior Publication Data
US 2021/0232422 A1 Jul. 29, 2021

(51) Int. Cl.
G06F 9/44 (2018.01)
G06F 8/41 (2018.01)
G06F 9/48 (2006.01)
G06F 9/30 (2018.01)
G06F 9/32 (2018.01)
G06F 9/38 (2018.01)

(52) U.S. Cl.
CPC .......... *G06F 8/41* (2013.01); *G06F 8/443* (2013.01); *G06F 8/4452* (2013.01); *G06F 9/30007* (2013.01); *G06F 9/325* (2013.01); *G06F 9/3836* (2013.01); *G06F 9/4881* (2013.01)

(58) Field of Classification Search
CPC .......... G06F 8/41; G06F 8/443; G06F 8/4452; G06F 9/3007; G06F 9/325; G06F 9/3836; G06F 9/4881

USPC ............................................. 717/161
See application file for complete search history.

(56) References Cited

U.S. PATENT DOCUMENTS 5,276,819 A * 1/1994 Rau ............... G06F 9/30072
                                                        711/214
6,820,250 B2 * 11/2004 Muthukumar ...... G06F 8/4452
                                                        717/116
(Continued)

FOREIGN PATENT DOCUMENTS

CN 101807145 A 8/2010
CN 103425460 A 12/2013

OTHER PUBLICATIONS

Title: Applying data speculation in modulo scheduled loops, author: U Mahadevan etal, published on 2000.*
(Continued)

*Primary Examiner* — Chameli Das

(57) ABSTRACT

A method for scheduling instructions for execution on a computer system includes scanning a plurality of loop instructions that are modulo scheduled to identify a first instruction and a second instruction that both utilize a register of the computer system upon execution of the plurality of instructions. The loop has a first initiation interval. The first instruction defines a first value of the register in a first iteration of the loop and the second instruction redefines the value of the register to a second value in a subsequent iteration of the loop prior to a use of the first value in the first iteration of the loop. A copy instruction is inserted in the loop instructions to copy the first value prior to execution of the second instruction. A schedule is determined after the insertion of the one or more copy instructions giving a second initiation interval.

20 Claims, 9 Drawing Sheets

(56) References Cited

U.S. PATENT DOCUMENTS

| | | | | |
|---|---|---|---|---|
| 6,826,677 | B2* | 11/2004 | Topham | G06F 8/441 712/216 |
| 8,136,107 | B2* | 3/2012 | Zaks | G06F 9/30101 717/160 |
| 2002/0120923 | A1* | 8/2002 | Granston | G06F 8/4452 717/160 |
| 2006/0150161 | A1* | 7/2006 | Onder | G06F 9/384 717/127 |
| 2010/0037037 | A1* | 2/2010 | Lee | G06F 9/3885 712/E9.023 |
| 2014/0007061 | A1* | 1/2014 | Perkins | G06F 9/381 717/150 |
| 2016/0328236 | A1* | 11/2016 | Kamatsuka | G06F 9/30138 |
| 2017/0060581 | A1 | 3/2017 | Patil | |
| 2020/0278848 | A1* | 9/2020 | Ebcioglu | G06F 8/40 |

OTHER PUBLICATIONS

Title: Iterative modulo scheduling: An algorithm for software pipelining loops, author: BR Rau etal, published on 1994.*

Title: Optimum modulo schedules for minimum register requirements; author: AE Eichenberger, published on 1995.*

Title: Modulo schedule buffers, author: MC Merten; published on 2001.*

Llosa, Josep, Antonio González, Eduard Ayguadé, and Mateo Valero. "Swing module scheduling: a lifetime-sensitive approach." In Proceedings of the 1996 Conference on Parallel Architectures and compilation Technique, pp. 80-86 IEEE, 1996.

Rau, B. Ramakrishna. "Iterative modulo scheduling: An algorithm for software pipelining loops." In Proceedings of the 27th annual international symposium on Microarchitecture, pp. 63-74. ACM, 1994.

Stoutchinin, Artour. "An integer linear programming model of software pipelining for the MIPS R8000 processor." In International Conference on Parallel Computing Technologies, pp. 121-135. Springer, Berlin, Heidelberg, 1997.

Huff, Richard A. "Lifetime-sensitive modulo scheduling." In ACM SIGPLAN Notices, vol. 28, No. 6, pp. 258-267. ACM, 1993.

Hagog, Mostafa, and Ayal Zaks. "Swing modulo scheduling for gcc." In Proceedings of the 2004 GCC Developers' Summit, pp. 55-64. 2004.

* cited by examiner

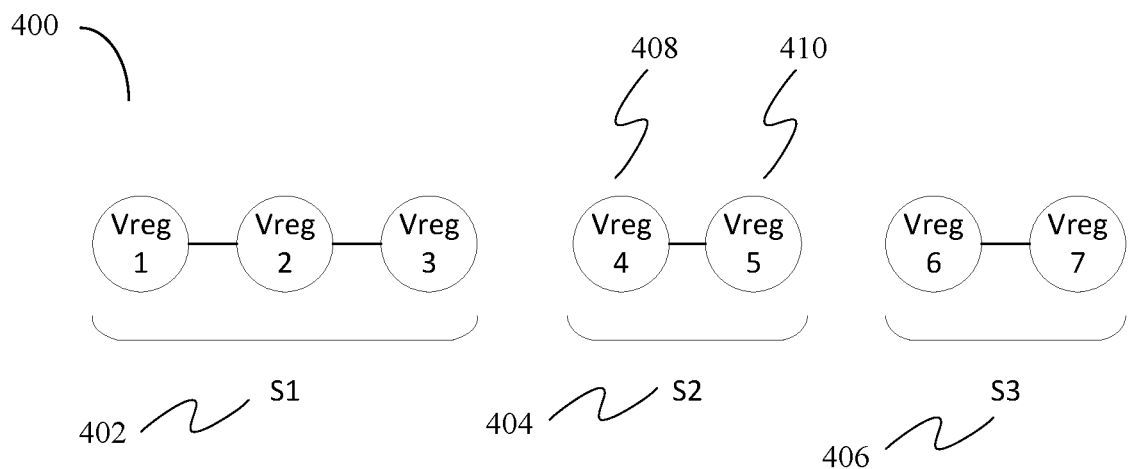
Figure 4
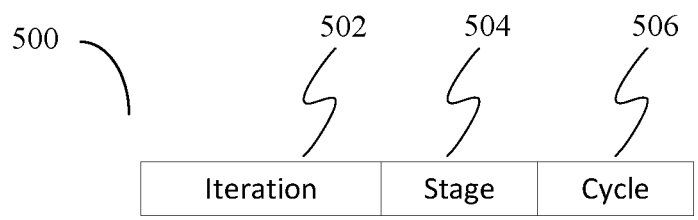
Figure 5
| Key | Contents |
|---|---|
| R1 (vreg) | Pointer to S1 addresses |
| R2 (vreg) | Pointer to S2 addresses |
Figure 6

METHOD AND APPARATUS FOR PREDICTING AND SCHEDULING COPY INSTRUCTION FOR SOFTWARE PIPELINED LOOPS

CROSS-REFERENCE TO RELATED APPLICATIONS

This is the first application filed for the present invention.

FIELD OF THE INVENTION

The present invention pertains to the field of software compilers and in particular to a method and apparatus for maximizing instruction level parallelism of software loops with dependencies between iterations of the loop.

BACKGROUND

Software pipelining is a known optimization technique for maximizing instruction level parallelism in computer applications. A software loop, a series of loop instructions that are executed (carried out) multiple times, is an attractive case to take advantage of software pipelining techniques when multiple iterations (repetitions) of the loop may be executed in parallel on multi-processor, multi-core, multi-thread hardware, or other parallel processing hardware. Software pipelining optimization allows for overlapping execution of iterations of loops and increases the opportunity for running instructions in parallel resulting in performance improvements. When software loops are pipelined, instructions can be issued from the next iteration of a loop as soon as resources or data are available.

The effectiveness of software pipelining may be constrained by the instructions of the loop itself. For example, if an iteration of a loop defines (writes or updates) a variable and then uses (reads) it, the execution of the next iteration of the loop may have to be delayed so that the variable's value isn't updated in the next iteration until the current iteration of the loop has used the value.

Software pipelining of loops seeks to optimize the initiation interval (II) of the loop. The II is the number of cycles of an iteration of a loop that must be executed before execution of the next iteration of the loop can start. II may be measured in machine cycles and a scheduler will aim to have as low an II as possible in order to increase pipelining.

Once the instructions of a loop have been scheduled, the introduction of new instructions can have an impact as they may lead to an increase in the II. One of the common issues that can hurt performance is when register move instructions, such as copy instructions, are generated after software pipelining has been scheduled. This can occur when software pipelining is used on SSA (static single assignment) form code. If the II is too low, there is a higher chance that the loop will not execute correctly due to a register value being redefined (set to a different value) before it is used in a previous loop. (Typically, registers in a computer system are hardware components that hold values, such as data values, for processing.) If the II is higher than necessary, the code becomes inefficient.

Therefore, there is a need for a method and apparatus for predicting and scheduling copy instruction for software pipelined loops, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for scheduling instructions for execution on a computer system. In accordance with embodiments of the present invention, there is provided a method including scanning a plurality of loop instructions that are modulo scheduled to identify a first instruction and a second instruction of the plurality of loop instructions that both utilize a register of the computer system upon execution of the plurality of instructions. The loop has a first initiation interval. The first instruction defines a first value of the register in a first iteration of the loop. The second instruction redefines the value of the register to a second value in a subsequent iteration of the loop prior to a use of the first value in the first iteration of the loop. The method also includes inserting one or more copy instructions in the plurality of loop instructions to copy the first value prior to execution of the second instruction, and determining a schedule for the plurality of loop instructions after the insertion of the one or more copy instructions. The schedule includes a second initiation interval.

Further embodiments include comparing the schedule to a second schedule of the plurality of loop instructions, and selecting one of the schedule and the second schedule.

In other embodiments, the first instruction and the second instruction form a disjoint set of virtual registers defined by the plurality of instructions.

In other embodiments, the disjoint set further comprises a root node. The root node acts as a key to a hash table. The hash table comprises a pointer to an address of the first instruction and an address of the second instruction.

In other embodiments, the address of the first instruction and the address of the second instruction both comprise an iteration, a stage, and a cycle.

In other embodiments, the first instruction and the second instruction are tied operands.

In other embodiments, the plurality of loop instructions have a static single assignment form and the first instruction is a phi node.

In other embodiments, the register of the computer system corresponds to a physical register of a target processor or the plurality of loop instructions.

In other embodiments, the one or more copy instructions includes two copy instructions, the first of the two copy instructions inserted after the second instruction and prior to the use of the first value in the first iteration of the loop.

In other embodiments, wherein the one or more copy instructions includes one copy instruction inserted after the second instruction and in parallel to the use of the first value in the first iteration of the loop.

In other embodiments, the one or more copy instructions includes one copy instruction inserted in parallel with the second instruction and prior to the use of the first value in the first iteration of the loop.

In accordance with embodiments of the present invention, there is provided an apparatus for scheduling instructions for execution on a computer system. The apparatus includes a CPU and a non-transitory computer readable storage medium configured to store compiler instructions to control the CPU to perform steps of scanning a plurality of loop instructions that are modulo scheduled to identify a first instruction and a second instruction of the plurality of instructions that both utilize a register of the computer system upon execution of the plurality of instructions. The loop has a first initiation interval. The first instruction defines a first value of the register in a first iteration of the loop. The second instruction redefines the value of the register to a second value in a subsequent iteration of the loop prior to a use of the first value in the first iteration of the loop. Further steps include inserting one or more copy instructions in the plurality of loop instructions to copy the first value prior to execution of the second instruction, and determining a schedule for the plurality of loop instructions after the insertion of the one or more copy instructions. The schedule includes a second initiation interval.

In some embodiments, the steps further include comparing the schedule to a second schedule of the plurality of loop instructions, and selecting one of the schedule and the second schedule.

In further embodiments, the first instruction and the second instruction form a disjoint set of virtual registers defined by the plurality of instructions.

In further embodiments, the disjoint set further comprises a root node, the root node acting as a key to a hash table, the hash table comprising a pointer to an address of the first instruction and an address of the second instruction.

In further embodiments, the address of the first instruction and the address of the second instruction both comprise an iteration, a stage, and a cycle.

In further embodiments, the first instruction and the second instruction are tied operands.

In further embodiments, the plurality of loop instructions have a static single assignment form and the first instruction is a phi node.

In further embodiments, the register of the computer system corresponds to a physical register of a target processor or the plurality of loop instructions.

In accordance with embodiments of the present invention, there is provided a non-transitory computer readable medium storing instructions executable in one or more processors. The instructions when executed in the one or more processors causing operations including scanning a plurality of loop instructions that are modulo scheduled to identify a first instruction and a second instruction of the plurality of instructions that both utilize a register of the computer system upon execution of the plurality of instructions. The loop has a first initiation interval. The first instruction defines a first value of the register in a first iteration of the loop. The second instruction redefines the value of the register to a second value in a subsequent iteration of the loop prior to a use of the first value in the first iteration of the loop. The operations also include inserting one or more copy instructions in the plurality of loop instructions to copy the first value prior to execution of the second instruction, and determining a schedule for the plurality of loop instructions after the insertion of the one or more copy instructions. The schedule includes a second initiation interval.

BRIEF DESCRIPTION OF THE FIGURES

Further features and advantages of the present invention will become apparent from the following detailed description, taken in combination with the appended drawings, in which:

FIG. 4 illustrates a disjoint set data structure used to represent sets of virtual registers in an embodiment.

FIG. 5 illustrates an 'address' data structure used in an embodiment.

FIG. 6 illustrates a hash table used to track vregs of disjoint sets in an embodiment.

It will be noted that throughout the appended drawings, like features are identified by like reference numerals.

DETAILED DESCRIPTION

Figure 1:
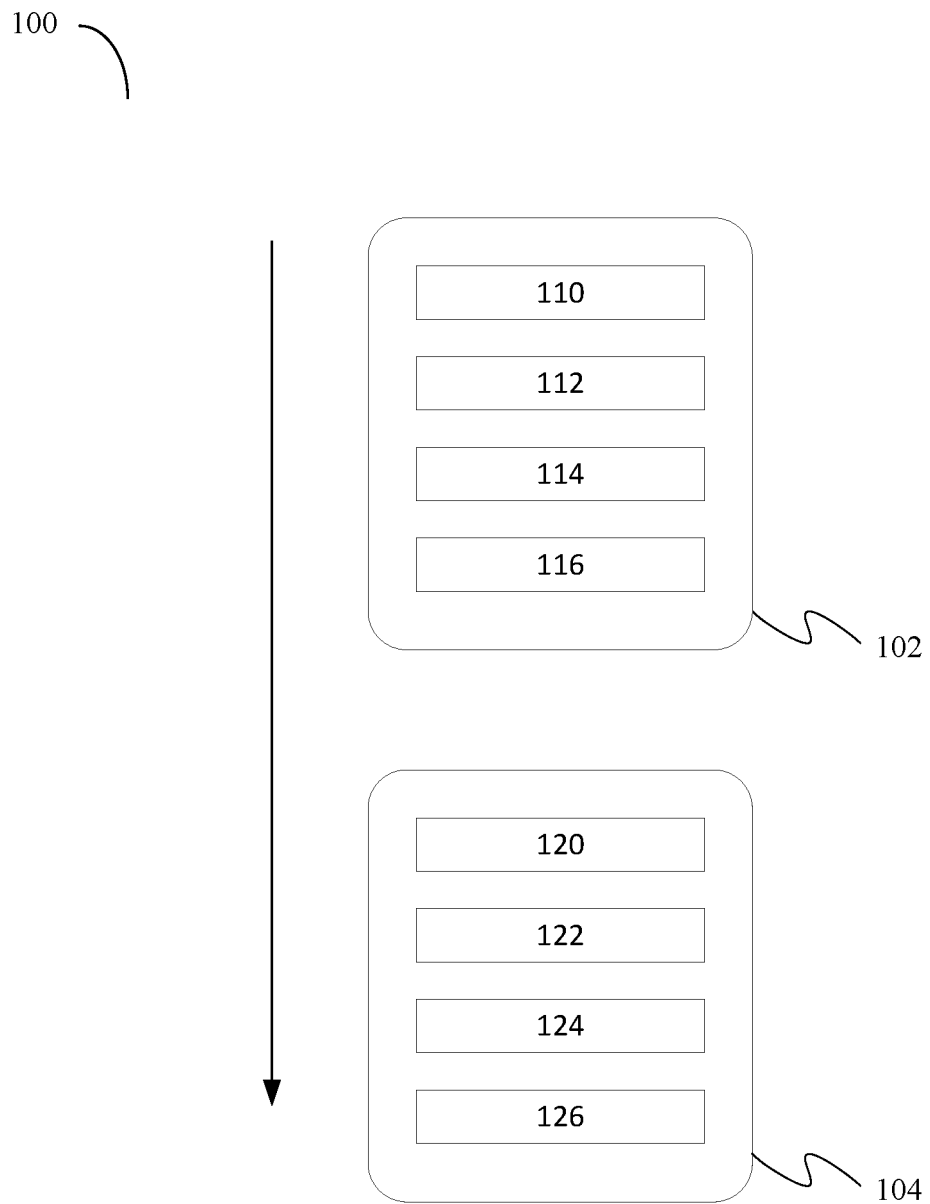
FIG. 1 illustrates an example of the execution of a software loop 100 without software pipelining.

Embodiments of the invention provide methods for scheduling instructions on a computer system and apparatus to implement instruction level parallelism of software loops. Loops include instructions that are or may be executed repeatedly or through a number of iterations; instructions in the loop may be referred to as loop instructions. Embodiments comprise methods and apparatus to predict the impact on the initiation interval (II) due to the introduction of copy instructions that may be generated as a result of instruction scheduling when translating out of static single assignment (SSA) form.

Instruction scheduling is a process performed by a compiler on a computer that, among other things, rearranges instructions in order to optimize the execution of the instructions (contained in a computer program) for a target computer system that will execute the computer program. Instruction scheduling may be used to minimize execution time of the computer program, meet power consumption constraints, or timing constraints of the target computer system. Instruction scheduling performs a number of optimizations including the analysis of data dependencies between instructions and the allocation of registers that are used by the instructions.

Modulo Scheduling is one software pipelining method that aims to select a schedule for a loop iteration such that, when the schedule is repeated, no constraints are violated. By way of general background, modulo scheduling is a scheduling technique for reducing loop processing time and using processor resources more efficiently, such that a plurality of iterations of the loop are performed in parallel, rather than one after the other. In some embodiments, the constraint is that if a virtual register (vreg) value is defined (referred to as a 'def'), that the register value must not be modified prior to being read or acted upon (referred to as a 'use'). In some cases, this causes an increase in the II of the loop that limits the benefits of software pipelining. Compilers may insert copy instructions in the loop in order to save the value of a virtual register into a second vreg to be accessed by the use, before it is modified by a subsequent loop, in order to decrease the II and obtain performance increases through software pipelining. (Basically, a virtual register need not include all of the physical hardware of a hardware register; but a virtual register generally behaves like a register in all or some respects.)

Embodiments of the invention predict the impact of the inserted copy instructions in order to maximize the performance gain from modulo scheduling. For a particular schedule, embodiments predict how many copy instructions will be generated, how these instructions can be scheduled in the loop and what will be their impact on the II. In some embodiments, this includes generating a first schedule, then comparing it to a second generated schedule in order to pick the better schedule based on a selection criteria. Predicting copy instructions allows for the optimization or tuning of SSA form code since, when a copy exists, the impact of the new copy instruction on the schedule and the II can be determined. Embodiments seek to minimize any increase in the II due to the introduction of new copy instructions. The impact of copy instructions and their impact on the II may be determined for multiple schedules to allow for an optimal schedule to be selected.

FIG. 1 illustrates an example of the execution of a software loop 100 without software pipelining. A first iteration of the loop 102 is followed sequentially by a second iteration of the loop 104. In this example, each loop comprises four instructions. The first iteration 102 comprises instructions 110, 112, 114, and 116 which are executed in order. The second iteration 104 comprises instructions 120, 122, 124, and 126 which are executed in order. In some embodiments each individual instruction depicted may be a group of instructions, such as a very long instruction word (VLIW) instruction. The instruction, or group of instructions, will execute in one machine cycle of the computer system that it is being executed on. In some embodiments, one machine cycle will be one clock cycle.

Figure 2:
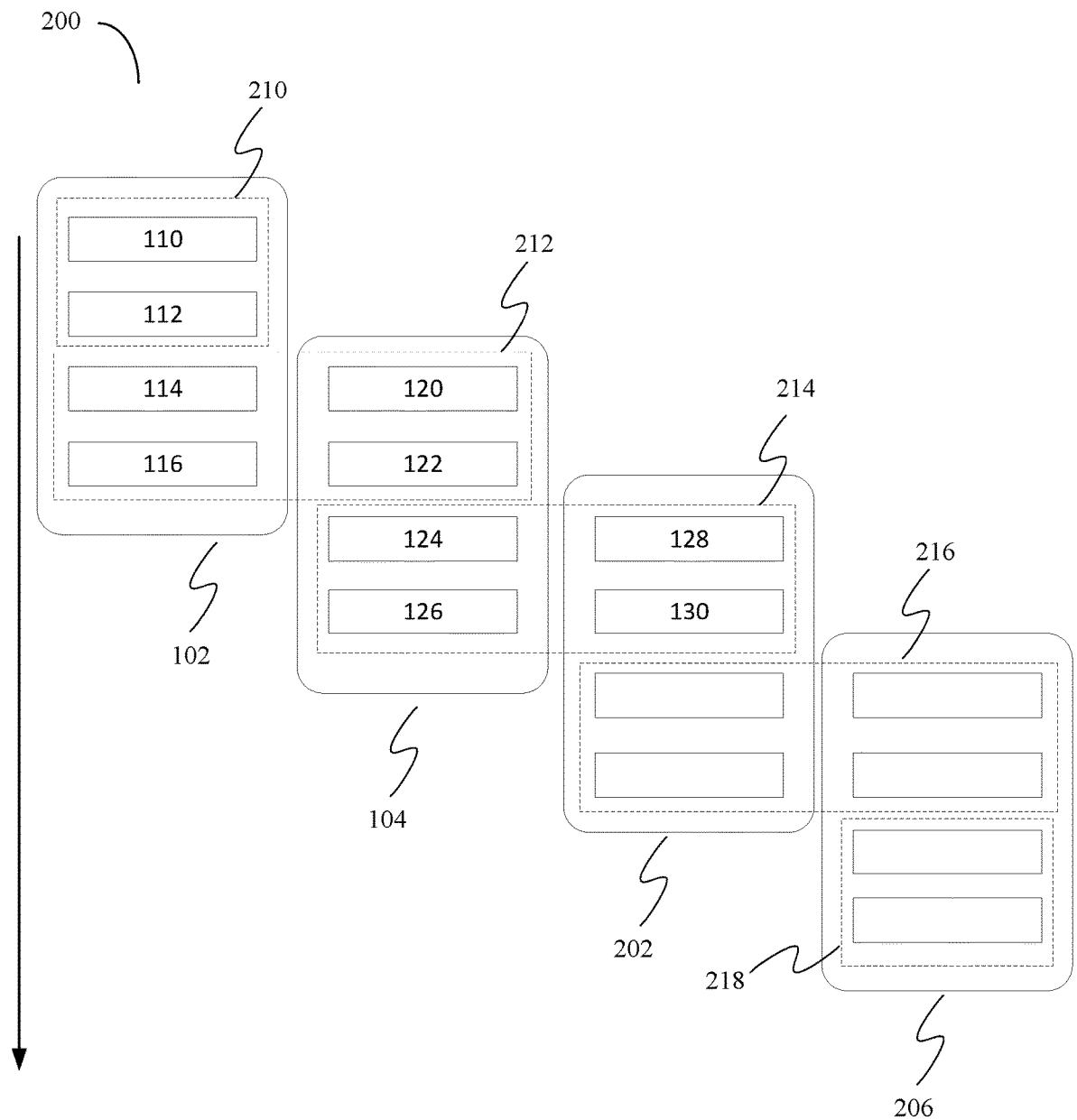
FIG. 2 illustrates software pipelining according to a broad aspect.

FIG. 2 illustrates software pipelining according to an embodiment. In order to illustrate the embodiment only four iterations (102, 104, 202, and 206) of the loop are shown though in other embodiments the number of iterations is not limited. The iterations of the loop will be scheduled using software pipelining so that instructions that are horizontally aligned in FIG. 2, such as instruction 114 and instruction 120, and instruction 116 and instruction 122, will be executed simultaneously. Simultaneous execution may be done on multiple processors, multiple cores, or other suitable parallel processing hardware.

At the beginning of execution, instructions 110 and 112 of the first iteration 102 of the loop will be executed sequentially. This forms the prologue 210 of the loop. Once the prologue has been executed, groups of instructions are executed using modulo scheduled software pipelining, such as the instructions of the first kernel loop 212. Other kernel loops illustrated in FIG. 2 are the second kernel loop 214, and the third kernel loop 216. The number of kernel loops is only limited by the number of iterations performed by the loop. In the first kernel loop 212, instruction 114 from the first loop iteration 102 is executed simultaneously with instruction 120 from the second loop iteration 104. Then, instruction 116 from the first loop iteration 102 is executed simultaneously with instruction 122 from the second loop iteration 104. Similarly, in the second kernel loop 214 the instructions from the second loop iteration 104 and the third loop iteration 202 are executed. The instructions from the third loop iteration 202 and the fourth loop iteration 206 in the third kernel loop 216. At the end of the execution of the third kernel loop 216, the remaining instruction of the fourth iteration 206 of the loop are executed sequentially as the epilogue 218.

The prologue, each kernel loop, and the epilogue all comprise an II number of instructions and take II cycles to execute, assuming each instruction may be executed in one machine cycle, taking into account other processing optimizations such as hardware pipelining.

Each instruction may be defined as having an iteration (such as 102, 104, 202, and 206), a stage (such as 210, 212, 214, 216, and 218), and a cycle. In the example of FIG. 2, the kernel loops 212, 214, and 216, each have two stages. Number of stages could be higher, but in many embodiments are usually limited to 3 or 4. Using this notation, instruction 112 may be expressed as iteration 1, stage s1, cycle c2. Instruction 120 may be expressed as iteration 2, stage s1, cycle c1. Instruction 126 may be expressed as iteration 2, stage s2, cycle c2.

Figure 3A:
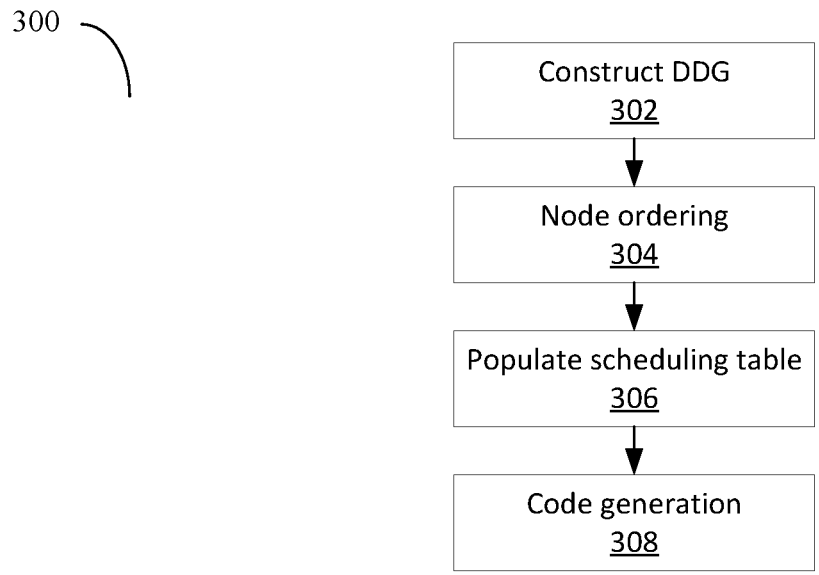
FIG. 3A illustrates an exemplary modulo scheduling algorithm.
Figure 3B:
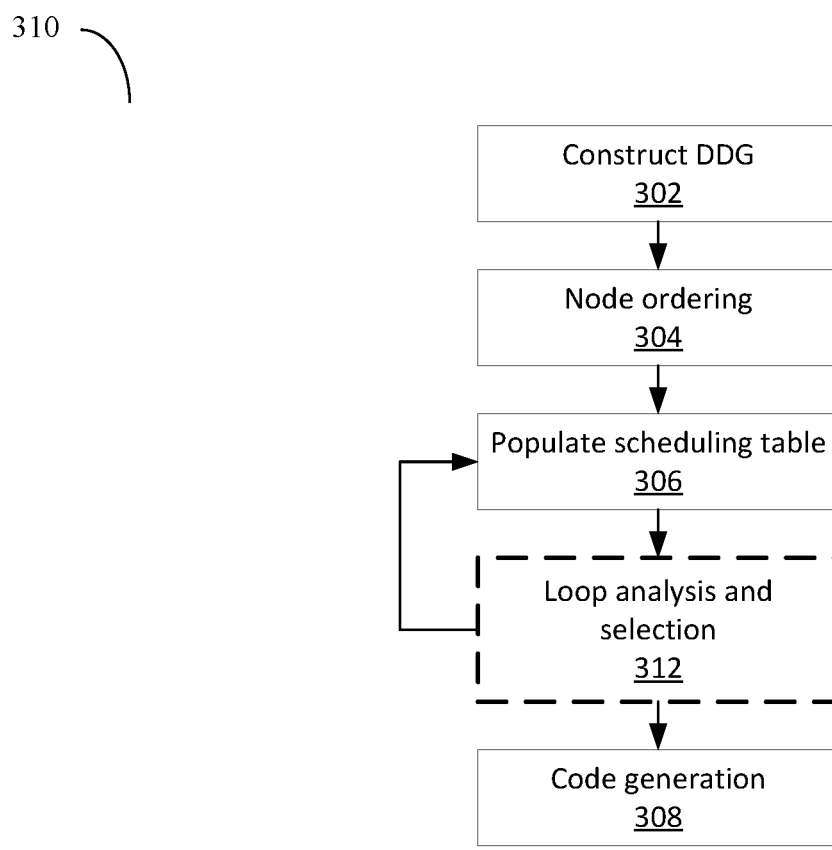
FIG. 3B illustrates a scheduling algorithm comprising a loop analysis and selection step according to an embodiment.

As illustrated in FIG. 3A, modulo scheduling algorithms 300 typically start by constructing a data dependency graph (DDG) 302. This is followed by a node ordering step 304. Next a scheduling table is populated 306, and then code is generated 308. The scheduling table allows for the definition of when each instruction of the loop is to be executed. As shown in FIG. 3B, embodiments insert a loop analysis and selection step 312 between the population of the scheduling table 306 and the code generation 308 steps. This allows for repeatedly modifying the loop schedule and determining the resulting impact on the II. In particular, this allows for the optimization of loops that are heavily impacted by copy instructions. Selection of the schedule may be done based on any number of criteria or combination of criteria, however in some embodiments the selection will be based on minimizing the II. Other embodiments will try and minimize the number of stages.

The loop analysis and selection algorithm 312 according to an embodiment examines the execution of the prologue 210 and the first kernel loop 212 as shown in FIG. 2. The algorithm of loop analysis and selection 312 will be described for the example where the loop has two stages. Other embodiments may be realized for a higher number of stages.

Embodiments of the loop analysis and selection step 312 utilize three new data structures. FIG. 4 illustrates a disjoint set data structure 400 to represent sets of virtual registers. A disjoint set includes at least two sets that have no element in common, or two sets whose intersection is the empty set. Illustrated are three disjoint sets S1 402, S2 404, and S3 406. As an example, set S2 404 comprises vreg4 408 and vreg5 410. When the loop analysis and selection step 312 is initialized the disjoint set 400 may be empty. It is populated by sets that represent virtual registers that may be mapped to the same hardware register upon execution of the generated code. In some embodiments, the sets may be defined by virtual registers that may be mapped to other limited resources as dictated by the hardware. Set information is used to determine when a hardware register may be updated between a def instruction and a corresponding use instruction during an iteration of a loop by a def instruction in another iteration of the loop that occurs due to software pipelining. With reference to FIG. 2, if in a first iteration 102, instruction 110 is a def for a vreg and instruction 116 uses vreg, then instruction 120 of subsequent iteration 104 may redefine vreg after 110 has defined it but before instruction 116 can use it leading to incorrect execution of the first iteration 102 of the loop.

The second is an 'address' data structure 500 as shown in FIG. 5. The address 500 is used to dynamically indicate when an instruction will be executed and comprises an iteration 502, a stage 504, and a cycle 506 that uniquely identifies each instruction of all iterations of a loop.

The third is a hash table 600 as shown in FIG. 6. The hash table 600 maps a virtual register to a set of addresses. Each set 402, 404, 406 of the disjoint set 400 has a root node that may be used as a key to a pointer to the other members of the set and may be used to identify all members of a set of the disjoint set 400. The topmost node in a tree structure is called the root node.

Methods according to an embodiment comprise two scanning phases. In the first phase the disjoint set 400 of virtual addresses is created and hash table 600 is populated. In the second phase the effect of the insertion of copy instructions is analyzed and the resulting II determined in order to determine a scheduling table and perform code generation.

Figure 7:
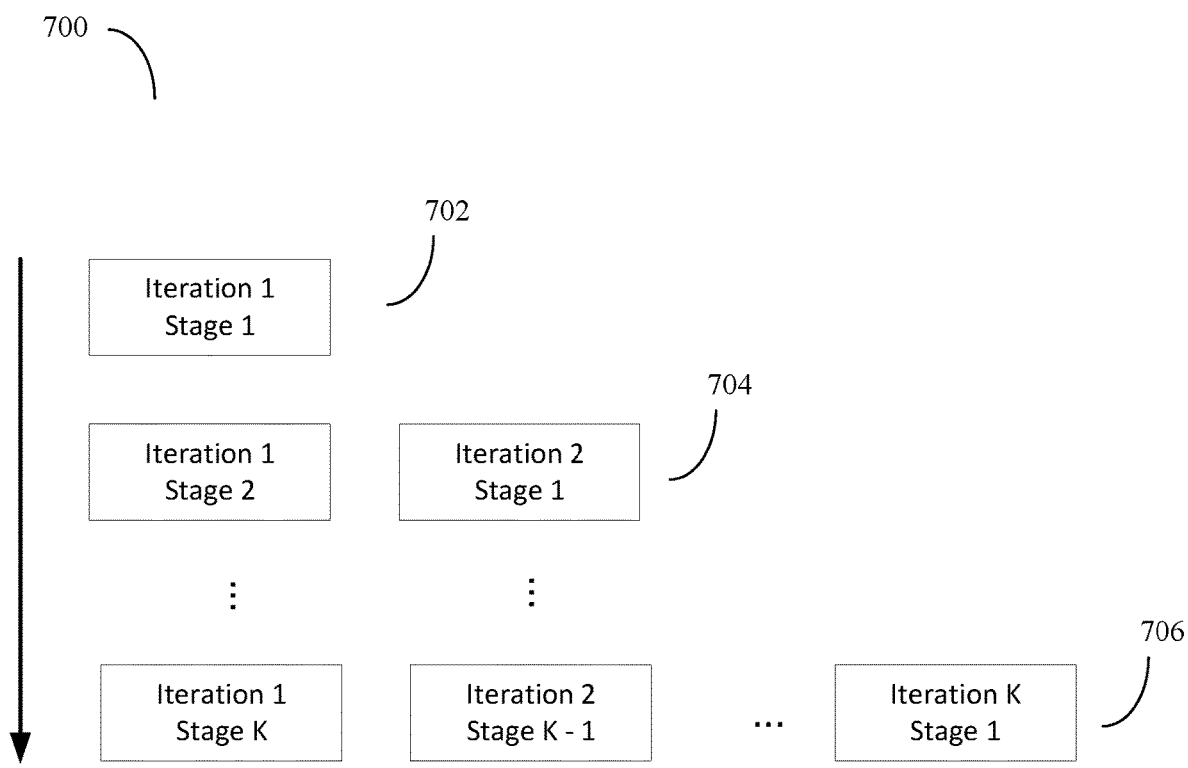
FIG. 7 illustrates the first phase scanning of instructions.

As illustrated in FIG. 7, the first phase starts by scanning stages of instructions that will be executed simultaneously in order to identify virtual registers (vregs) that may be defined or used by each instruction. In general, scanning refers to examining or looking at. As discussed herein, more than one instruction (that is, a plurality of instructions) may be scanned simultaneously or at nearly the same time. The scan 700 starts with the scanning of the instruction of iteration 1, stage 1 702 of the loop, corresponding to the prologue 110. The instructions of iteration 1, stage 1 may be scanned in any order. Next, the algorithm scans and identifies vregs used in iteration 1, stage 2 and iteration 2, stage 1 704. Assuming K stages in total, the algorithm proceeds until it scans iteration 1, stage K, iteration 2, stage K−1, . . . , iteration K, stage 1 706. At the completion of the scanning process of FIG. 7, all the instructions of iteration 1 of the loop have been analyzed. The vregs used are stored in sets of the disjoint set 400 for which the addresses may be determined by accessing the hash table 600.

Figure 8:
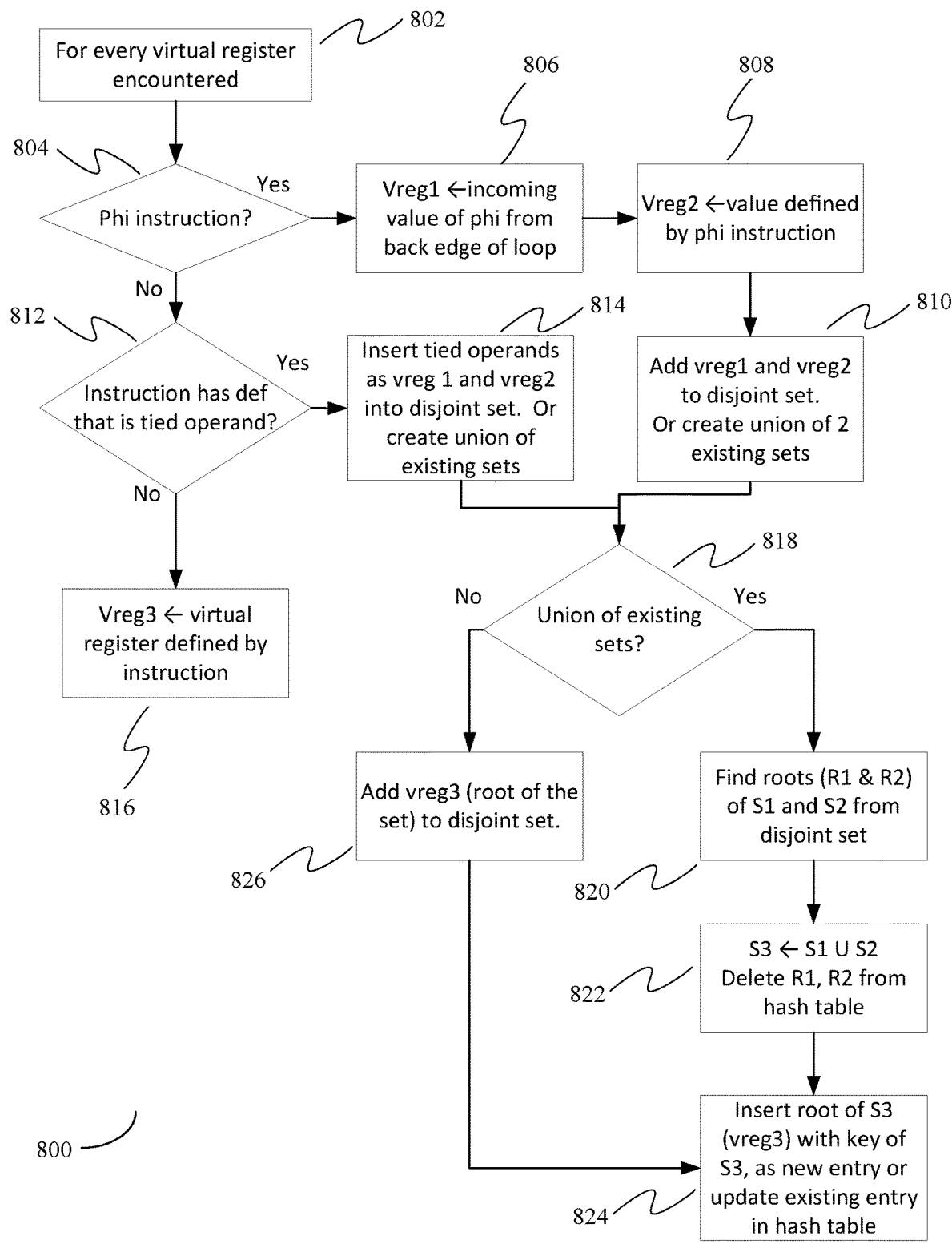
FIG. 8 provides a detailed view of scanning an instruction during phase 1.
Figure 9:
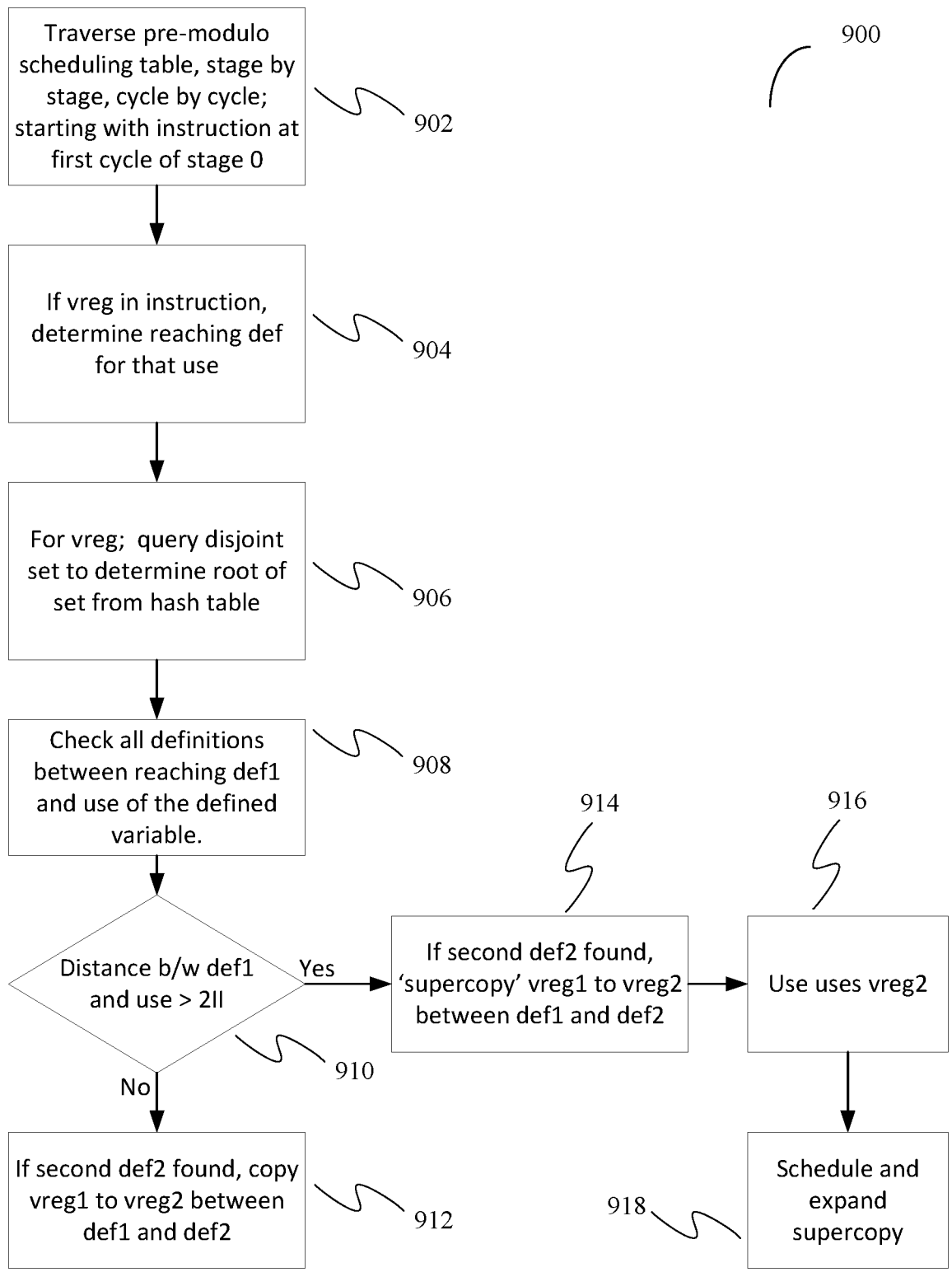
FIG. 9 illustrates the second phase scanning of instructions.

For any virtual register 802 defined by each instruction that is encountered during the scanning 700, one of three actions may be taken as illustrated in FIG. 8. These actions are taken for the cases of a phi instruction, instructions with tied operands, and for other instructions.

A phi instruction is an instruction that can take on a different value depending on which path the control flow took previous to the instruction. If the instruction is a phi instruction 804, the incoming value to the phi instruction is found from the back-edge of the loop and will be assigned to vreg1 806. Vreg2 is used to denote the value defined by the phi instruction 808. Both vreg1 and vreg2 are then added to the same set in the disjoint-set data structure 400. If one of vreg1 or vreg2 is already present in a set, the other vreg is added to the already existing set. If vreg1 and vreg2 are both already present in existing sets 810, then a union of the two sets is created and vreg3 is used to denote the root of the set. For the two sets that have been merged into the union, the disjoint set 400 will be queried to determine the roots, R1 and R2, of both sets 820. These roots, which are keys 602 to the hash table 600, will be used to delete 822 the separate sets that have been merged, and vreg3, the root of the merged set, will become a new entry or updated entry in the hash table 600.

If vreg1 and vreg2 are new virtual registers, then vreg3 is added as the root of a new disjoint set 826 and vreg3, the root of the new set, will become a new entry in the hash table 600. Alternatively, vreg 1 or vreg 2 could also be the root of the new set.

A tied operand is when the underlying hardware instruction is implemented in a manner that 'ties' two registers together. An example is an addition operation that adds the value of two registers and stores the result in one of the two registers. If an instruction identified as having vregs in 700 comprises tied operands then both vreg1 and vreg2 are added to the same disjoint set 400. If one of vreg1 or vreg2 is already present in a set, the other vreg is added to the already existing set. If vreg1 and vreg2 are both already present in existing sets 810, then a union of the two sets is created and vreg3 is used to denote the root of the set. For the two sets that have been merged into the union, the disjoint set 400 will be queried to determine the roots, R1 and R2, of both sets 820. These roots, which are keys 602 to the hash table 600, will be used to delete 822 the merged sets and vreg3, the root of the merged set, will become a new entry or updated entry in the hash table 600. In cases with more than two vregs are tied operands, all the tied vregs will be added to the same disjoint set data structure as outlined above.

For any other instruction 816 for which a virtual register is defined, the vreg is added to the disjoint set 400 and an entry in the hash table 600 is created. If the instruction defines multiple virtual registers, a separate disjoint set is created for each vreg and a separate entry is created in the hash table for each set.

If during step 818 above, a union of two pre-existing sets is created, the root of each of these two sets is determined by querying the hash table 600. If the roots of the two sets are R1 and R2, then R1 and R2 are keys to pointers to addresses 500 to disjoint sets S1 and S2. A new set of addresses is generated for S3, which is the union of S1 and S2. Next, R1 and R2 are deleted from the hash table and a new entry is inserted in the hash table for the root of the new set, S3, that contains R1 and R2.

Entries in the hash table 600 may be updated if they previously exist. If there is no existing entry, an entry with an empty set is first created, then a pointer to the address triplet 500 that indicates the address of the instruction is added to the hash table 600.

In the second phase of an embodiment, the scheduling table 306 is traversed, stage by stage and cycle by cycle, examining each instruction of the loop. As this is done before the code undergoes modulo scheduling, the instructions checked all belong to a generic iteration of the loop. Embodiments look at all virtual registers used by each instruction as identified in the first phase and contained in the disjoint set 400. For each use of a vref, by an instruction, the reaching def for that use may be determined statically. The reaching def for a use is the last def instruction prior to the use instruction. The reaching def will write the value to the vref that will be read by the use instruction.

Then the algorithm looks up the hash table for the vref of the use under investigation. The algorithm first queries the disjoint set and then queries the hash table for the corresponding root of the set. In an example, the reaching def is defined in iteration 1, stage s1 and cycle c1 and the use we are interested in, is in iteration 1, stage s2, cycle c2. In this example, both the reaching def and the use access vref1. Now the algorithm checks every def that appears "between" these two that may modify the vref after the reaching def and before the use may access it. Since this second phase uses only one iteration of the loop, when determining if a def is between the reaching def and the use, only the stage and cycle is used, the iteration is ignored. Between the reaching def (referred to as def1) and the use (referred to as use1) there may be other definitions, def2, defN. Since def1 is the reaching def, def2, defN belong to other iterations. In order to execute correctly, a copy instruction (referred to as a 'super-copy') is inserted between def1 and def2 to copy the value of vref1 to a new virtual register, vref2, and use1 is updated to access vref2 instead of vref1.

In some embodiments, a super-copy is expanded into multiple copy operations. For example, in the case where a def and use are more than 2×II cycles away from each other, software pipelining will schedule three of more iterations for parallel execution. In this case, a single copy will be insufficient. The algorithm will first insert a super-copy instruction between def1 and def2 and update the use to use the output of the super-copy instruction. Then the algorithm will decide how to schedule and expand the super-copy. Depending on where the super-copy is inserted, the expansion might be different.

Figure 10:
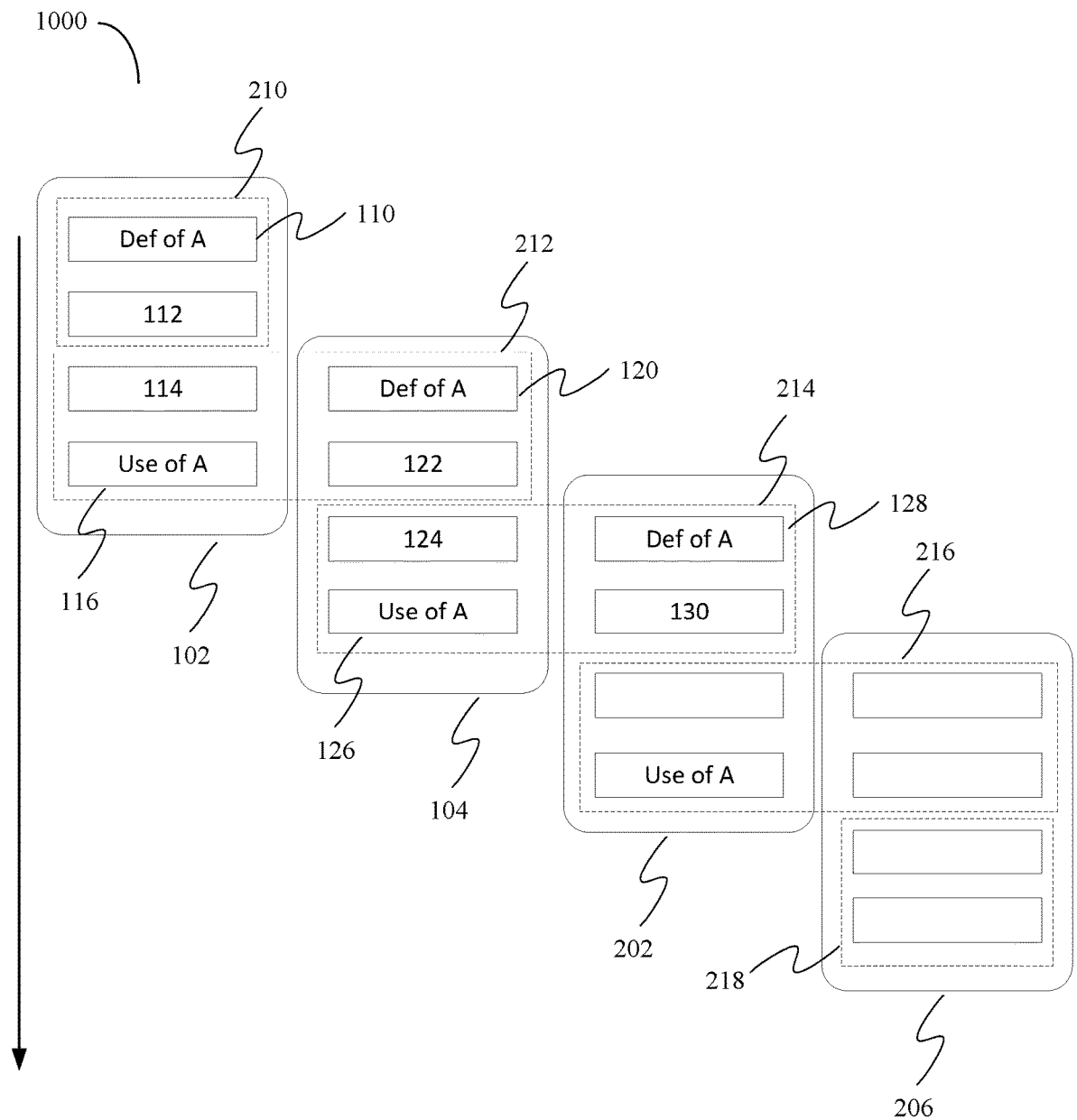
FIG. 10 illustrates intervals for expanding super-copy instructions.

With reference to FIG. 10, the address 500 of def of A 110, has iteration=1 102. For a second def of A, we might have iteration=3 104 (case A) or iteration=3 202 (case B). Then consider an instance of Def1 in iteration K of the original loop, and an instance. of Def2 in iteration K+1 (case A) or iteration K+2 (case B) of the original loop. In the modulo scheduled loop 1000, the use 116 will be executed between def1 120 and def2 128. Embodiments examine the schedule table and partition the region between def1 and def2, to two intervals. The first interval is between def1 120 and the boundary between the stage 212 and the stage 214. The second interval is between the boundary between the stage 212 and the stage 214 and the next def of A. There are multiple options on where to expand the super-copy instruction. The expansion process is known in the art and therefore not described in detail.

Once all copies are expanded, it may result in a new II for the loop, II+c. The algorithm can consider scheduling the loop for all possible values of II in the inclusive interval of [II, II+c]. Depending on where a copy is expanded, a different number of copy instructions may be required in the expansion. Expansion of copy instructions may be done in both intervals described above to determine the impact of the additional copy instructions and the resulting impact on the II. By determining the impact of multiple options, a desired option may be selected. In some embodiment, the best schedule will be the one with the smallest II. Depending on the computer system that will execute the generated code, optimizations such as exploiting rotating register files and selective loop unrolling can further result in eliminating the new copy instructions. In embodiments, these factors may be taken into account and the results evaluated before code generation occurs.

Figure 11:
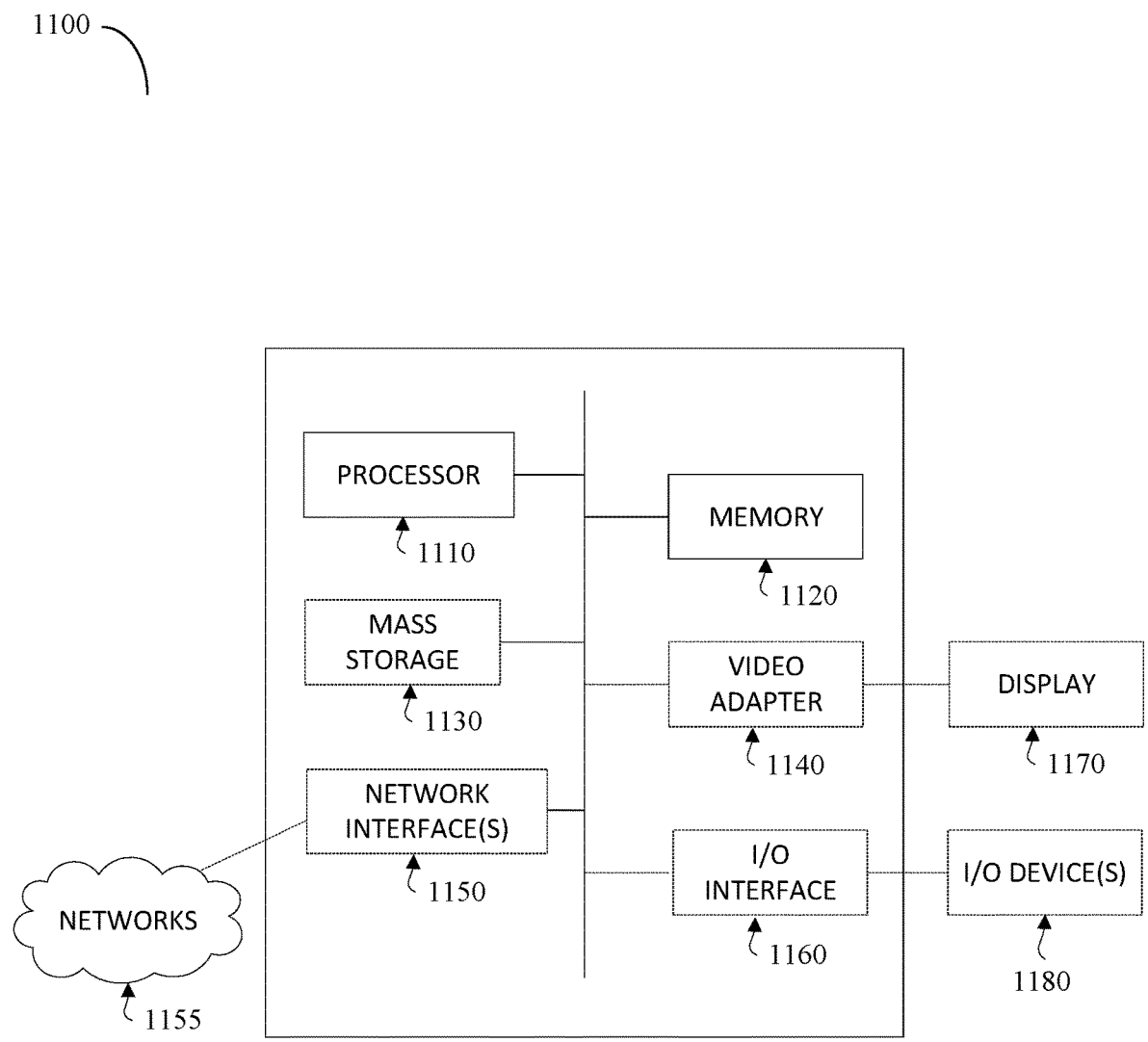
FIG. 11 illustrates an exemplary computer system used by embodiments.

FIG. 11 is block diagram of a computer (or computing) system that may be used for implementing the methods and apparatus disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computer system includes a processing unit 1100. The processing unit 1100 typically includes a central processing unit (CPU) 1110, a bus and a memory 1120, and may optionally also include a mass storage device 1130, a video adapter 1140, and an I/O interface 1160 (each shown in dashed lines to indicate they are optional). The computer system may further include one or more network interface(s) 1150 for connecting the computer system to communication networks 1155.

The CPU may comprise any type of electronic data processor, and may include one or more cores or processing elements. The memory may comprise any type of non-transitory system memory such as static random access memory (SRAM), dynamic random access memory (DRAM), synchronous DRAM (SDRAM), read-only memory (ROM), or a combination thereof. In an embodiment, the memory may include ROM for use at boot-up, and DRAM for program and data storage for use while executing programs. The bus may be one or more of any type of several bus architectures including a memory bus or memory controller, a peripheral bus, or a video bus.

The mass storage may comprise any type of non-transitory storage device configured to store data, programs, and other information and to make the data, programs, and other information accessible via the bus. The mass storage may comprise, for example, one or more of a solid state drive, hard disk drive, a magnetic disk drive, or an optical disk drive.

The video adapter 1140 and the I/O interface 1160 provide optional interfaces to couple external input and output devices to the processing unit. Examples of input and output devices include a display 1170 coupled to the video adapter 1140 and an I/O device 1180 such as a touch-screen coupled to the I/O interface 1160. Other devices may be coupled to the processing unit, and additional or fewer interfaces may be utilized. For example, a serial interface such as Universal Serial Bus (USB) (not shown) may be used to provide an interface for an external device. Alternatively, the computer system may rely upon the network interface(s) for connection to available mass storage(s), video adapter(s), and I/O interface(s) available on the networks.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for scheduling instructions for execution on a computer system, the method comprising:
scanning a plurality of loop instructions of a loop that are modulo scheduled to identify a first loop instruction and a second loop instruction of the plurality of loop instructions that both utilize a register of the computer system upon execution of the plurality of loop instructions, the loop having a first initiation interval, the first loop instruction defining a first register value of the register in a first iteration of the loop, the second instruction defining a second register value to the register in a subsequent iteration of the loop prior to a use of the first register value in the first iteration of the loop;

inserting one or more copy instructions in the plurality of loop instructions to copy the first register value prior to execution of the second loop instruction;

determining a schedule for the plurality of loop instructions after the insertion of the one or more copy instructions, the schedule comprising a second initiation interval.

2. The method of claim 1 further comprising comparing the schedule to a second schedule of the plurality of loop instructions, and selecting one of the schedule and the second schedule.

3. The method of claim 1 wherein the first loop instruction and the second loop instruction form a disjoint set of virtual registers defined by the plurality of loop instructions.

4. The method of claim 3 wherein the disjoint set further comprises a root node, the root node acting as a key to a hash table, the hash table comprising a pointer to an address of the first loop instruction and an address of the second loop instruction.

5. The method of claim 4 wherein the address of the first loop instruction and the address of the second loop instruction both comprise an iteration, a stage, and a cycle.

6. The method of claim 3 wherein the first loop instruction and the second loop instruction are tied operands.

7. The method of claim 1 wherein the plurality of loop instructions have a static single assignment form and the first loop instruction is a phi node.

8. The method of claim 1 wherein the register of the computer system corresponds to a physical register of a target processor or the plurality of loop instructions.

9. The method of claim 1 wherein the one or more copy instructions comprises two copy instructions, the first of the two copy instructions inserted after the second loop instruction and prior to the use of the first register value in the first iteration of the loop.

10. The method of claim 1 wherein the one or more copy instructions comprises one copy instruction inserted after the second loop instruction and in parallel to the use of the first register value in the first iteration of the loop.

11. The method of claim 1 wherein the one or more copy instructions comprises one copy instruction inserted in parallel with the second loop instruction and prior to the use of the first register value in the first iteration of the loop.

12. An apparatus for scheduling instructions for execution on a computer system, the apparatus comprising:

a CPU; and a non-transitory computer readable storage medium configured to store compiler instructions to control the CPU to perform steps of:

scanning a plurality of loop instructions of a loop that are modulo scheduled to identify a first loop instruction and a second loop instruction of the plurality of loop instructions that both utilize a register of the computer system upon execution of the plurality of loop instructions, the loop having a first initiation interval, the first loop instruction defining a first register value of the register in a first iteration of the loop, the second loop instruction defining a second register value to the register in a subsequent iteration of the loop prior to a use of the first register value in the first iteration of the loop;

inserting one or more copy instructions in the plurality of loop instructions to copy the first register value prior to execution of the second loop instruction;

determining a schedule for the plurality of loop instructions after the insertion of the one or more copy instructions, the schedule comprising a second initiation interval.

13. The apparatus of claim 12, wherein the CPU further performs steps of comparing the schedule to a second schedule of the plurality of loop instructions, and selecting one of the schedule and the second schedule.

14. The apparatus of claim 12 wherein the first loop instruction and the second loop instruction form a disjoint set of virtual registers defined by the plurality of loop instructions.

15. The apparatus of claim 14 wherein the disjoint set further comprises a root node, the root node acting as a key to a hash table, the hash table comprising a pointer to an address of the first loop instruction and an address of the second loop instruction.

16. The apparatus of claim 15 wherein the address of the first loop instruction and the address of the second loop instruction both comprise an iteration, a stage, and a cycle.

17. The apparatus of claim 14 wherein the first loop instruction and the second loop instruction are tied operands.

18. The apparatus of claim 12 wherein the plurality of loop instructions have a static single assignment form and the first loop instruction is a phi node.

19. The apparatus of claim 12 wherein the register of the computer system corresponds to a physical register of a target processor or the plurality of loop instructions.

20. A non-transitory computer readable medium storing instructions executable in one or more processors, the instructions when executed in the one or more processors causing operations comprising:

scanning a plurality of loop instructions of a loop that are modulo scheduled to identify a first loop instruction and a second loop instruction of the plurality of loop instructions that both utilize a register of a computer system upon execution of the plurality of loop instructions, the loop having a first initiation interval, the first loop instruction defining a first register value of the register in a first iteration of the loop, the second loop instruction defining a second register value to the register in a subsequent iteration of the loop prior to a use of the first register value in the first iteration of the loop;

inserting one or more copy instructions in the plurality of loop instructions to copy the first register value prior to execution of the second loop instruction;

determining a schedule for the plurality of loop instructions after the insertion of the one or more copy instructions, the schedule comprising a second initiation interval.

* * * * *